United States Patent
Cheng et al.

(10) Patent No.: US 8,442,303 B2
(45) Date of Patent: May 14, 2013

(54) CONSTRUCTING THREE-DIMENSIONAL MODEL APPARATUS

(75) Inventors: Kuo-Sheng Cheng, Tainan (TW); Wen-Hung Ting, Gueiren Township, Tainan County (TW); Cheng-Yu Chen, Tainan (TW); Chien-Hung Chen, Yongkang (TW); Chun-Wei Wang, Yongkang (TW)

(73) Assignee: National Cheng Kung University, Tainan (TW)

( * ) Notice: Subject to any disclaimer, the term of this patent is extended or adjusted under 35 U.S.C. 154(b) by 1215 days.

(21) Appl. No.: 12/250,137

(22) Filed: Oct. 13, 2008

(65) Prior Publication Data

US 2009/0310852 A1  Dec. 17, 2009

(30) Foreign Application Priority Data

Jun. 16, 2008  (TW) ................................ 97122437 A

(51) Int. Cl.
*G06K 9/00* (2006.01)

(52) U.S. Cl.
USPC .......................................................... 382/154

(58) Field of Classification Search .................. 382/154, 382/285, 100; 345/419, 427; 356/12
See application file for complete search history.

(56) References Cited

U.S. PATENT DOCUMENTS

| | | | |
|---|---|---|---|
| 6,674,917 B1* | 1/2004 | Hisaki et al. | 382/284 |
| 7,259,871 B2* | 8/2007 | Chen | 356/603 |
| 7,447,558 B2* | 11/2008 | Pratt | 700/118 |
| 7,965,860 B2* | 6/2011 | Holzner et al. | 382/100 |
| 2002/0028418 A1* | 3/2002 | Farag et al. | 433/29 |
| 2007/0132759 A1* | 6/2007 | Mallick et al. | 345/426 |
| 2008/0123937 A1* | 5/2008 | Arias Estrada et al. | 382/154 |

* cited by examiner

*Primary Examiner* — Edward Park
(74) *Attorney, Agent, or Firm* — McClure, Qualey & Rodack, LLP

(57) ABSTRACT

Disclosed are a method and an apparatus for constructing an accurate three-dimensional model. The apparatus includes a plurality of light sources, an image-capturing element and an image-processing unit. The present invention is used to integrate the two-dimensional images from different views of an object into a high accurate three-dimensional model. Compared with conventional apparatuses, the apparatus of the present invention is useful without safety problems, relatively easily manipulated, and capable of quick image reconstruction.

7 Claims, 15 Drawing Sheets

|   |   |   |
|---|---|---|
| 10 | 5 | 0 |
| 10 | 8 | 2 |
| 5 | 6 | 13 |

A

⇒

M

|   |   |   |
|---|---|---|
| 1 | -1 | -1 |
| 1 | 1 | -1 |
| -1 | -1 | 1 |

|   |   |   |
|---|---|---|
| 11 | 6 | 1 |
| 11 | 9 | 3 |
| 6 | 7 | 14 |

A'

⇒

M'

|   |   |   |
|---|---|---|
| 1 | -1 | -1 |
| 1 | 1 | -1 |
| -1 | -1 | 1 |

FIG. 8

CONSTRUCTING THREE-DIMENSIONAL MODEL APPARATUS

RELATED APPLICATIONS

This application claims priority to Taiwan Application Serial Number 97122437, filed Jun. 16, 2008, which is herein incorporated by reference.

FIELD OF THE INVENTION

The present invention relates to a method for constructing an accurate three-dimensional model and an apparatus thereof.

BACKGROUND OF THE INVENTION

Three-dimensional image construction techniques have been widely applied in modern researches encompassing various fields. For example, in dental application, the 3D image construction technique is utilized for constructing a 3D dental cast model of a patient as part of the patient's record, which helps dentists to determine the best treatment plan.

Currently, the three-dimensional images can be generated by 3D-model constructing devices such as computerized axial tomography (CT) scanner, magnetic resonance image (MRI) scanner or 3D laser scanner. By stacking a set of CT slices of an object in many parallel planes, we can easily obtain a 3D numerical representation of that object. MRI is based on nuclear magnetic resonance principle (NMR) and uses a gradient magnetic field to align the nuclear magnetization of atoms in an object to acquire raw MRI data (as NMR RF responses), which is transformed into a visual image that represents the internal structure image of the object. The 3D surface laser scanner uses laser light to measure distances from the scanner's sensor to an object in a systematic pattern whereby the 3D surface profile of the object is obtained by calculation of three-dimensional coordinates of the object's surface. Currently, it is widely applied in 3D model industries such as 3D animation, computer game or machine design.

However, small business such as personal studio or academic research laboratory cannot afford the above-mentioned conventional 3D-model constructing devices since they are quite expensive and cost millions of dollars. In addition, some of the devices have safety issues such as the high radiation exposure associated with CT scanner.

Some researches have been conducted to solve the above problems. For example, K. M. Lee et al. disclose a method to reconstruct the three-dimensional image model of an object using shape-from-shading algorithm ("Shape from shading with a linear triangular element surface model" *IEEE Trans. Patt. Anal. Mach. Intell.*, vol. 158, pp. 815-822, 1993). However, when the 3D-image model is reconstructed from only one image captured from one side of an object illuminated by a single light source, the reconstruction accuracy is adversely affected by the shadow cast by the rough surface of the object.

SUMMARY OF THE INVENTION

In accordance with one aspect of the present invention, there is provided a method for constructing an accurate three-dimensional model and apparatus thereof. In the present invention, the three-dimensional images from different views of an object are registered and integrated to generate a high accurate three-dimensional model thereby enlarging the imaging range of the three-dimensional model.

In certain embodiments of the present invention, the three-dimensional model constructing method comprises generating a first three-dimensional image and a second three-dimensional image according to two predetermined different views of the object; selecting a plurality of first control points on the first three-dimensional image and selecting a plurality of second control points on the second three-dimensional image, wherein the first controlled points are corresponding to the second control points, respectively; performing an affine transformation step and an elastic deformation step for registering the first three-dimensional image to the second three-dimensional image from the control points; and performing an image integration step to integrate the registered three-dimensional images into the accurate three-dimensional model by calculating the average gray level value of the corresponding pixels of the registered three-dimensional images.

In accordance with another aspect of the present invention, there is provided an apparatus for constructing a three-dimensional model of an object. The apparatus comprises a rotatable stage for supporting the object; a rotatable element; at least one light source fixed on the rotatable element such that the at least one light source rotates with the rotatable element to different predetermined positions for illuminating the object from different angles at a predetermined distance from the object; an image capturing element for capturing a plurality of two-dimensional images of said object under lighting at different angles, respectively; and an image processing element electrically connected to the image capturing element for generating a three-dimensional image by shape-from-shading algorithm based on the two-dimensional images.

In accordance with yet another aspect of the present invention, there is provided another apparatus for constructing a three-dimensional model of an object. The apparatus comprises a plurality of light sources disposed at different locations but at the same distance from the object; at least one image capturing element for respectively capturing a plurality of two-dimensional images of the object under illuminating by the light sources which are turned on one at a time; and an image processing element electrically connected to the image capturing element for generating the three-dimensional image by shape-from-shading algorithm based on the two-dimensional images.

Further, in certain embodiments of the present invention, the above light sources are arranged at different sides of the object and have a predetermined distance from the object such that the image capturing element can capture different images of the object under illuminating from different sides.

The present invention reconstructs 3D model from at least two 2D images acquired under illuminating from at least two different locations thereby significantly increasing the reconstruction accuracy.

In accordance with yet another aspect of the present invention, there is provided an apparatus for simply and quickly generating a three-dimensional model of an object.

In accordance with yet another aspect of the present invention, there is provided a low cost apparatus for generating a three-dimensional model of an object.

In accordance with yet another aspect of the present invention, there is provided an apparatus for generating a three-dimensional model at any place in a convenient way.

The apparatus of the present invention is capable of generating different shape-from-shading images of an object by illuminating the object from different angles thereby obtaining a highly accurate three-dimensional model. The apparatus of the present invention is portable. Therefore, it is easy to generate a three-dimensional image model at any place. Additionally, the apparatus of the present invention is useful without safety problems, relatively easily manipulated, and capable of quick image reconstruction.

BRIEF DESCRIPTION OF THE DRAWINGS

The foregoing aspects and many of the attendant advantages of this invention will become more readily appreciated as it becomes better understood by reference to the following detailed description, when taken in conjunction with the accompanying drawings, wherein:

FIG. 8 shows the gray level value matrix corresponding to the pixels around the first control point and the second control point according to one embodiment of the present invention;

DETAILED DESCRIPTION OF THE PREFERRED EMBODIMENT

Figure 1:
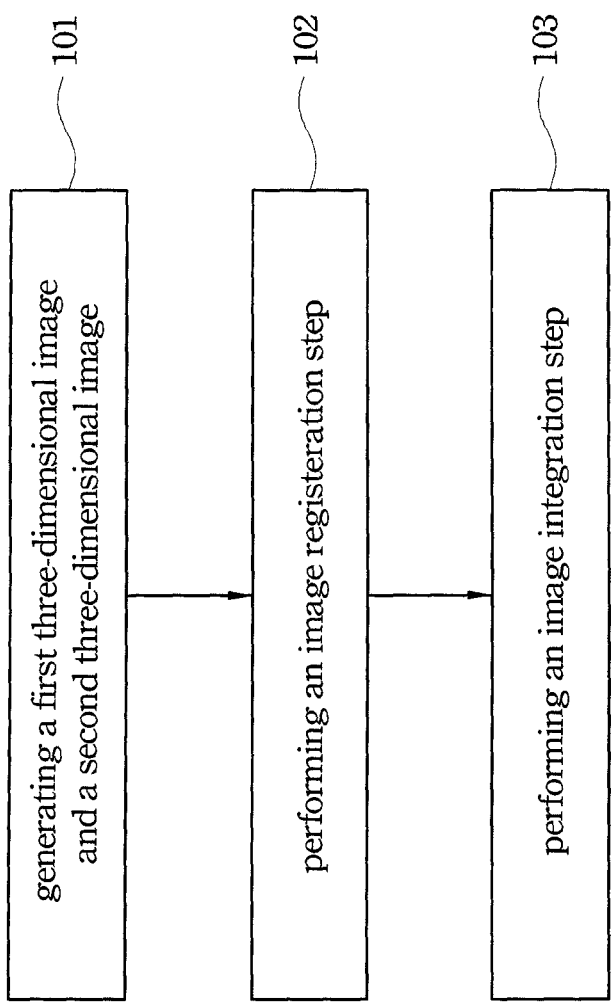
FIG. 1 shows the flow chart of a method for constructing a three-dimensional model according to one embodiment of the present invention.
Figure 2:
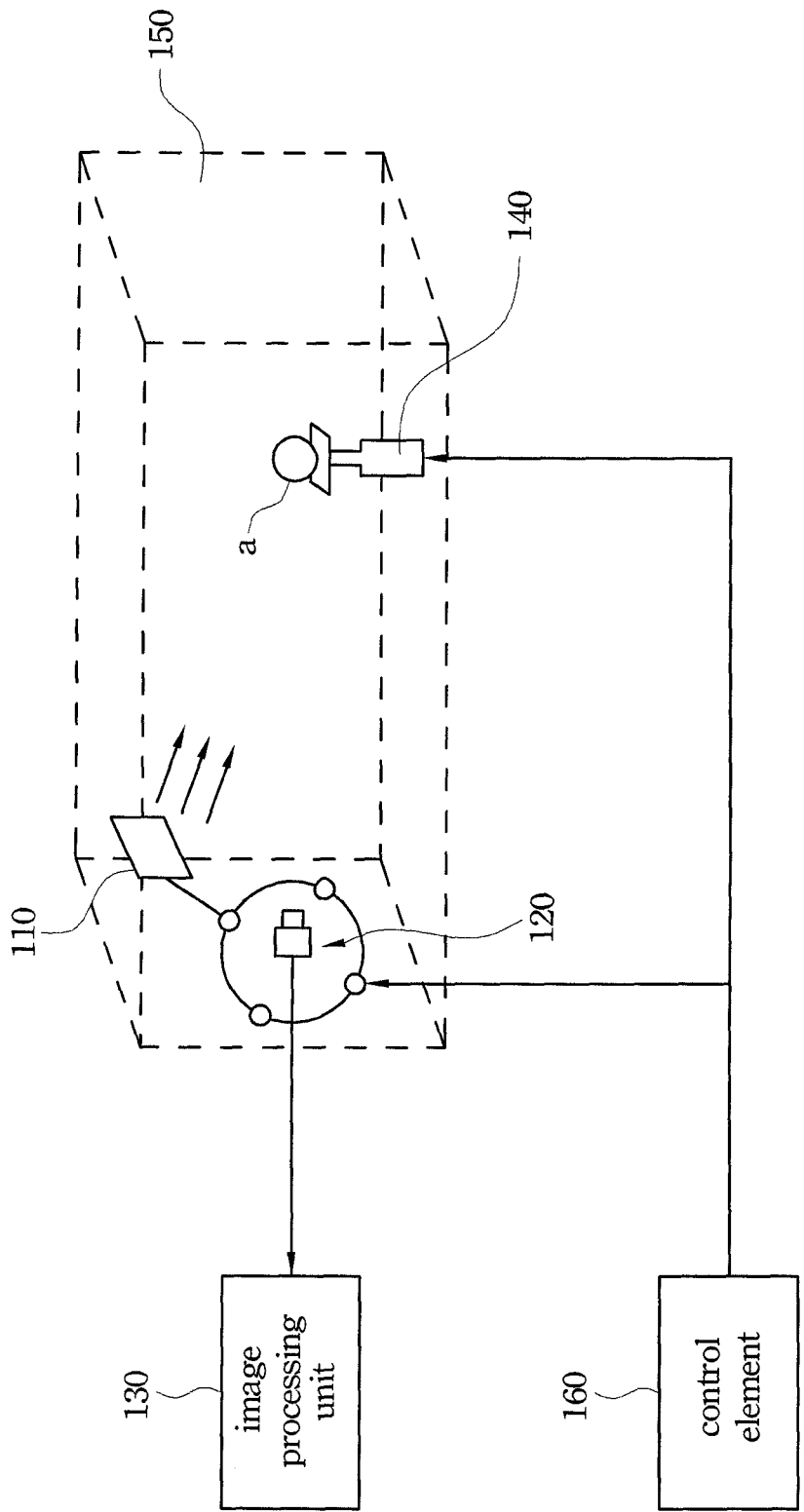
FIG. 2 is a schematic view of an apparatus for constructing a three-dimensional model according to one embodiment of the present invention.

FIG. 1 shows a flow chart of a method for constructing a three-dimensional model according to one embodiment of the present invention. FIG. 2 shows an apparatus for constructing a three-dimensional image according to one embodiment of the present invention. Referring to FIG. 1, the method mainly includes the steps of generating a first three-dimensional image and a second three-dimensional image (step101), performing an image registration step (step102), and performing an image integration step (step103) to generate an accurate three-dimensional model. The method of the present invention can be performed by a three-dimensional model constructing device 100.

Firstly, a first three-dimensional image 201 (see FIG. 7A) and a second three-dimensional image 202 (see FIG. 7B) are generated according to two different views of an object a. The first three-dimensional image and the second three-dimensional image have an overlapped area. In this embodiment, the method of the present invention is utilized to generate an accurate three-dimensional model of a dental cast. The first three-dimensional image 201 is generated according to the front view of the dental cast and the second three-dimensional image 202 is generated according to the side view of the dental cast.

Figure 3:
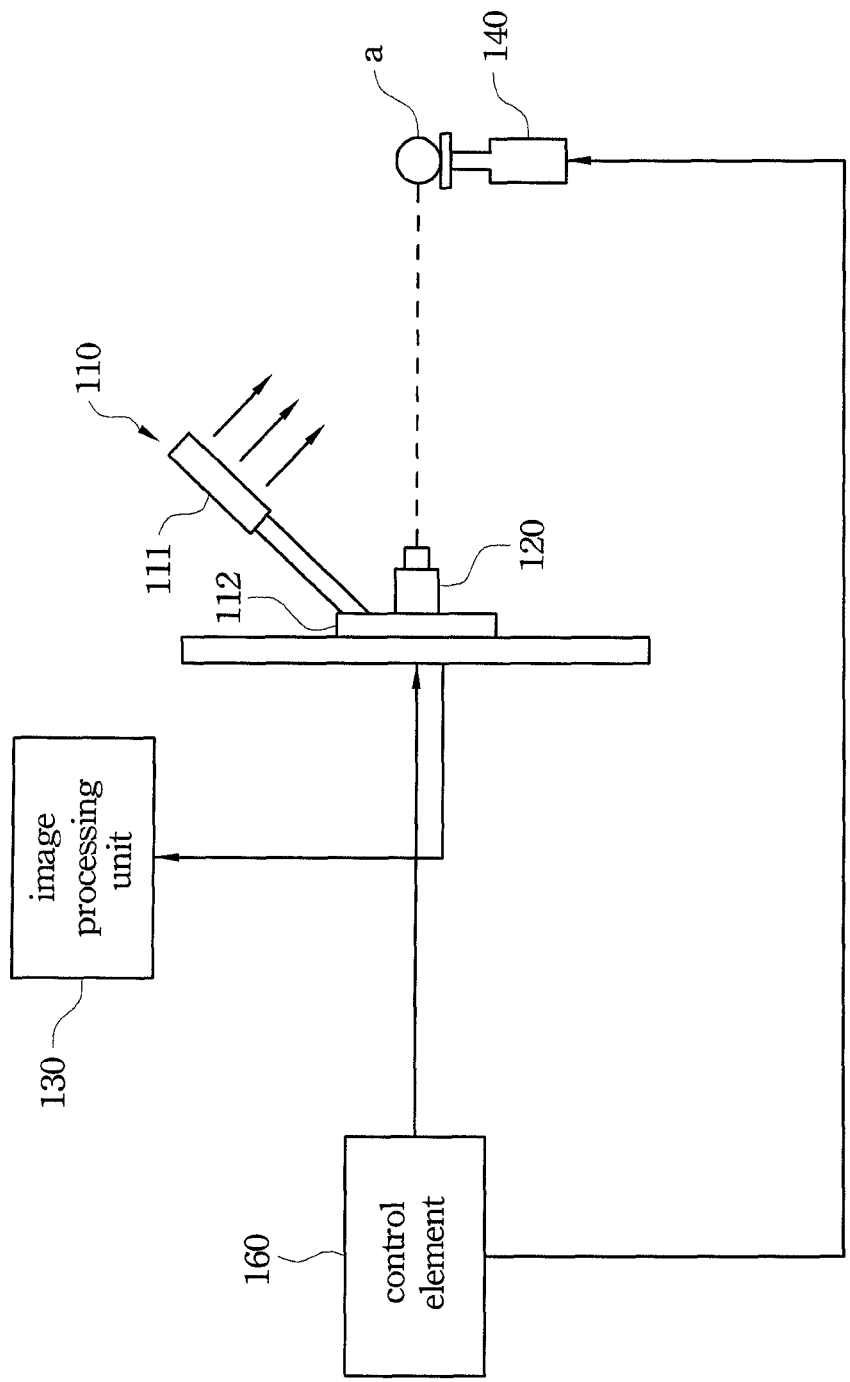
FIG. 3 is a side view of the apparatus of FIG. 2.

FIG. 3 shows an apparatus 100 for constructing a three-dimensional model according to one embodiment of the present invention. The three-dimensional model constructing device 100 comprises at least one light source 110, an image-capturing element 120, an image-processing unit 130, a rotatable stage 140, a light shielding device 150 and a control element 160. The light source 110 is disposed at a predetermined distance from the object a and controlled by the control element 160 for illuminating the object a from different angles at a predetermined distance from the object a. Therefore, the image capturing element 120 can capture a plurality of 2D images of the object a under illuminating from different angles. The light source 110 may be a point light source, and preferably a surface light source with high collimation. In this embodiment, the light source 110 may include a plurality of light-emitting diodes (LEDs) disposed on a substrate 111. The LEDs are densely arranged to form an LED array on the substrate 111. The substrate 111 is connected to a rotatable element 112 such as a motor. The substrate 111 is disposed at a predetermined angle with respect to the first side of object a. The rotatable element 112 is electrically connected to the control element 160 and controlled by control element 160 to rotate. Hence, the control element 160 controls the LED array on the substrate 111 to rotate from one angle to another angle with respect to the object a for illuminating the object a such that the image-capturing element 120 can capture the images of the first side of the object a under illuminating from different angles, respectively.

Figure 4:
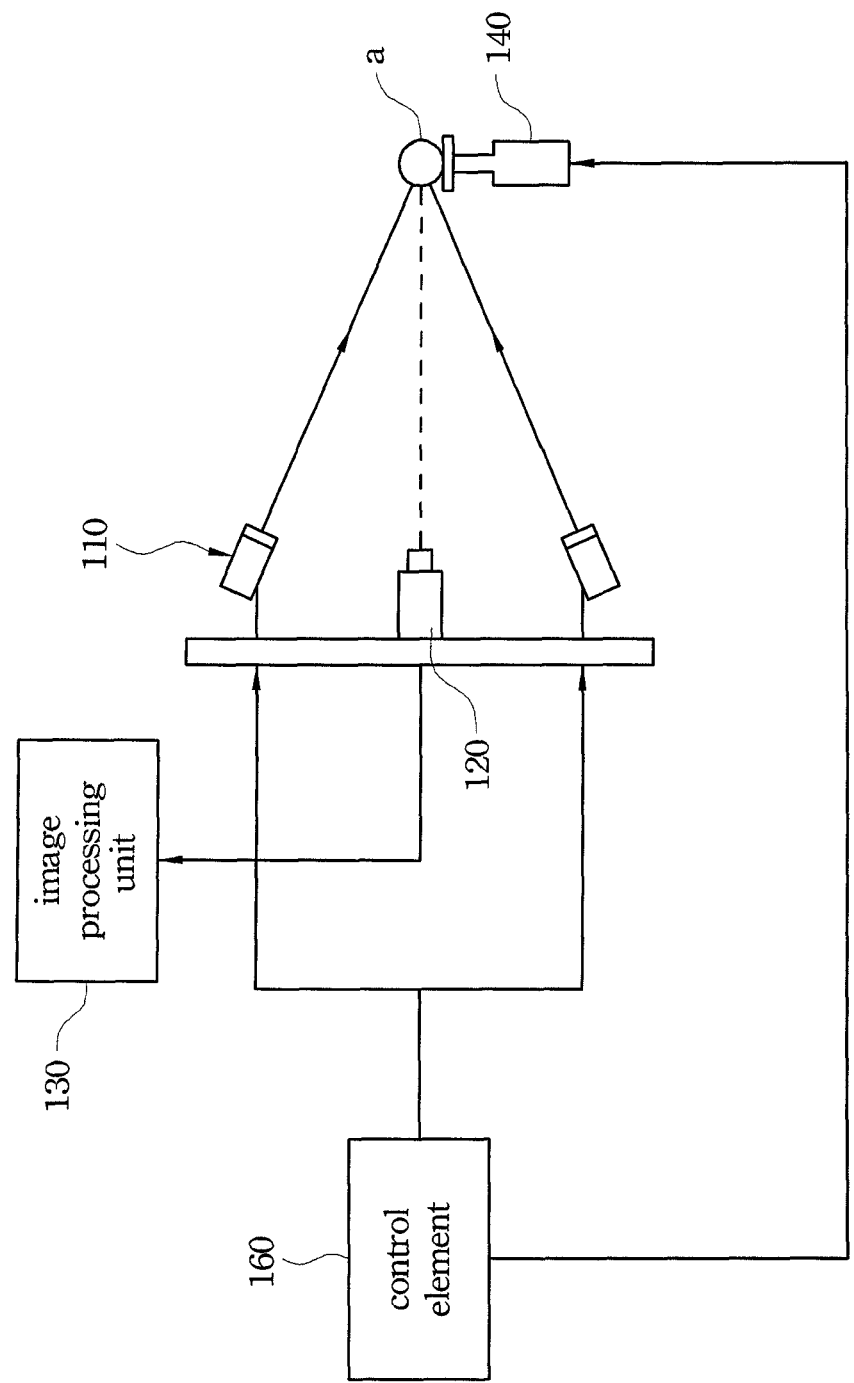
FIG. 4 is a side view of another apparatus for constructing a three-dimensional model according to another embodiment of the present invention.

FIG. 4 shows an apparatus 102 for constructing a three-dimensional model according to another embodiment of the present invention. The three-dimensional model constructing device 102 is provided with four light sources 110 disposed at different angles with respect to the first side of the object a, respectively. The control element 160 controls the four light sources 110 to illuminate the object a one at a time. Thus, the image-capturing element 120 can capture four images of the first side of the object a under illuminating by the four light sources 110, respectively.

The image-capturing element 120 is disposed at a predetermined distance from the object a to capture the images of the first side of object a under illuminating from different angles, respectively. The image-capturing element 120, e.g., a digital camera or a charge-coupled device (CCD), is electrically connected to the image-processing unit 130 for transmitting the 2D images of the object a to the image-processing unit 130 via, for example, a universal serial bus (USB) interface. In this way, the image-processing unit 130 may be provided within a computer and electrically connected to the image-capturing element 120 via the USB interface.

Figure 5:
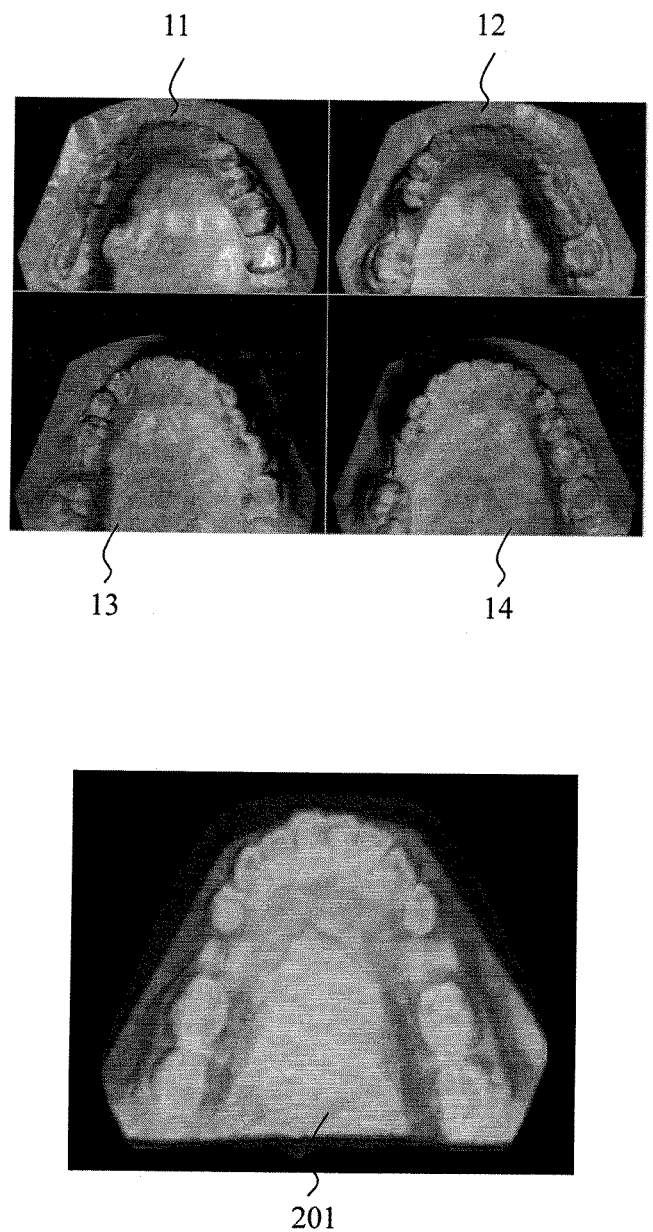
FIG. 5 shows two-dimensional images and a three-dimensional image generated according to one embodiment of the present invention.

FIG. 5 shows two-dimensional images 11, 12, 13 and 14, and a three-dimensional image 201 generated according to one embodiment of the present invention. The image-processing unit 130 is electrically connected to the image-capturing element 120 for processing the two-dimensional images to generate the three-dimensional image of the object a. The image-processing unit 130 may be a single chip or a programming logical controller (PLC). The image-processing unit 130 and the control element 160 may be formed within a single chip. The image-processing unit 130 converts the 2D images 11, 12, 13 and 14 captured from one side view of the object a into the three-dimensional image 201 by shape-from-shading algorithm which uses the shading information of 2D image to recover the 3-D image. Specifically, the image-processing unit 130 can convert the gray level values of the pixels of the images 11, 12, 13 and 14 into corresponding 3D data (e.g., the depth values of each pixel) thereby generating the first three-dimensional image 201 or the second three-dimensional image 202. The operational program of the image-processing 130 may be implemented by Visual C++.NET. Since these images 11, 12, 13 and 14 are captured when the object a are illuminated by the light source 110 from different angles, the images 11, 12, 13 and 14 have different shading information. Therefore, almost all of the structure details of the side view of the object a are presented by the images 11, 12, 13 and 14 thereby significantly increasing the 3D-image reconstruction accuracy of the present invention by shape-from-shading.

Note that the first three-dimensional image 201 and the second three-dimensional image 202 are generated according to predetermined different views of the object a, respectively. The first three-dimensional image 201 and the second three-dimensional image 202 show different structure details of different views of the object a. The first three-dimensional image 201 shows a higher image accuracy regarding the front view of the dental cast than the second three-dimensional image 202 since the first three-dimensional image 201 is reconstructed from the 2D front view images of the dental cast. By contrast, the second three-dimensional image 202 shows a higher image accuracy regarding the side view of the dental cast than the first three-dimensional image 201.

Figure 6A:
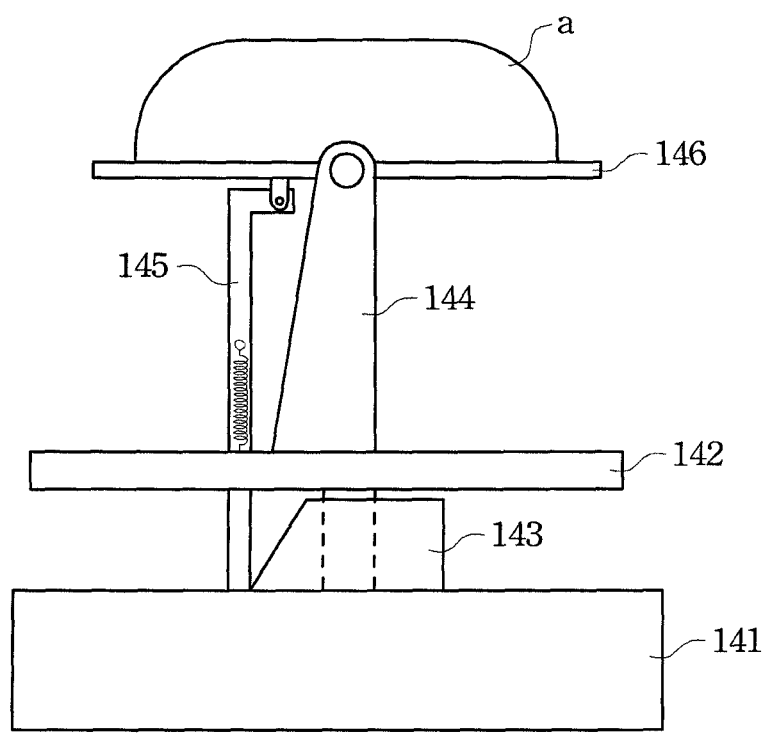
FIG. 6A and FIG. 6B are side views of a rotatable stage according to one embodiment of the present invention.
Figure 6B:
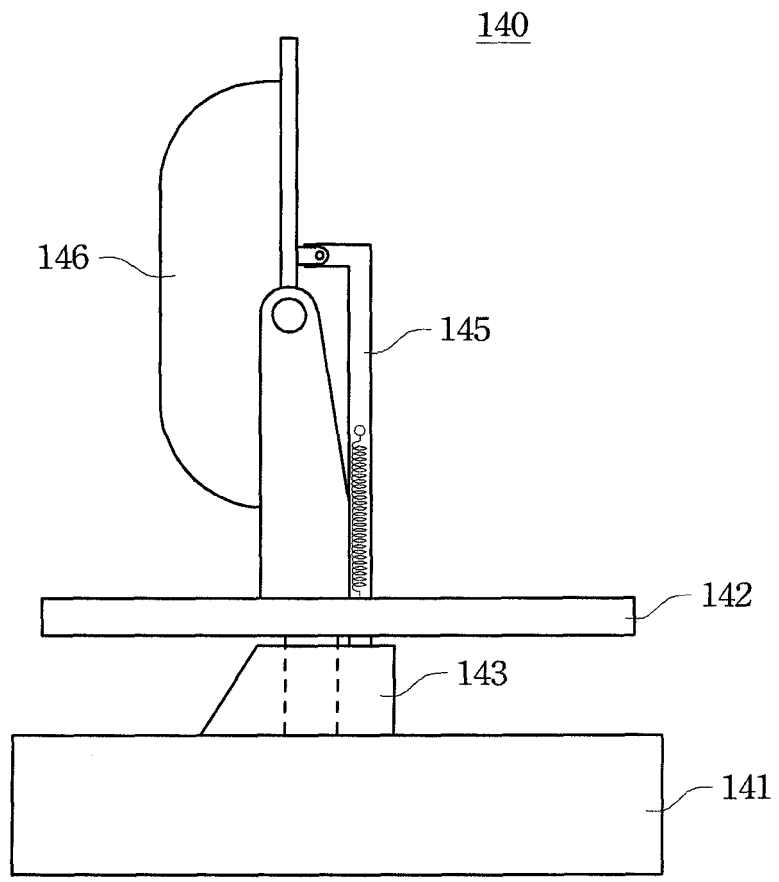

FIG. 6A and FIG. 6B show a rotatable stage 140 according to one embodiment of the present invention. The rotatable stage 140 is configured for supporting and rotating the object a. Specifically, the rotatable stage 140 includes a motor, e.g., a stepping motor, controlled by the control element 160 to rotate the object a thereby allowing different side views of the object a to be captured by the image-capturing element 120 in order to generate the three-dimensional images of different views of the object a, e.g., the first three-dimensional image 201 and the second three-dimensional image 202. In this embodiment, the rotatable stage 140 rotates the object a automatically. The rotatable stage 140 comprises a substrate 141, a rotatable body 142, a protrusion structure 143, a holder 144, a lever 145 and a rotatable plate 146. The substrate 141 is provided with a motor (not shown) for rotating.

The rotatable body 142 is pivotally connected to the substrate 141 and rotated by the motor (not shown) in the substrate 141. A predetermined gap is maintained between the substrate 141 and the rotatable body 142. The protrusion structure 143 is disposed between the substrate 141 and the rotatable body 142 and has an inclined plane. The holder 144 is fixed onto the rotatable body 142. The rotatable plate 146 is pivotally connected to one end of the holder 144 and the rotatable plate 146 is configured for fixing and rotating the object a. The lever 145 is disposed through the rotatable body 142 and connected to the rotatable body 142 by an elastic element. One end of the lever 145 is pivotally connected to the rotatable plate 146, and the other end of lever 145 abuts against the protrusion structure 143.

When the rotatable body 142 of the rotatable stage 140 rotates relative to the protrusion structure 143, the lever 145 moves up and down in accordance with the rotational angle of the rotatable body 142 since one end of the lever 145 abuts against the protrusion structure 143.

When the lever 145 is moved to the surface of the substrate 141 (see FIG. 6A) by the rotatable body 142, the lever 145 is moved to a lower position. When the lever 145 is moved to the surface of the protrusion structure 143 (see FIG. 6B) by the rotatable body 142, the lever 145 is moved to an upper position. Therefore, the rotatable plate 146 is allowed to automatically rotate between a horizontal position (see FIG. 6A) and a vertical position (see FIG. 6B) by the upward and downward movement of the lever 145 pivotally connected thereto. In this way, the three-dimensional model constructing device 100 can obtain the three-dimensional images of two different views of the object a by the rotatable stage 140.

The light-shielding device 150 may be a box with a black inner surface or a black curtain for preventing light from affecting the reconstruction accuracy of the three-dimensional model. If the light-shielding device 150 is a box, the light source 110, the image-capturing element 120, the rotatable stage 140 and the control element 160 can be disposed within the light-shielding device 150 and connected to the image-processing unit 130 by the universal serial bus (USB) interface. Therefore, the apparatus of the present invention is a portable apparatus, which can be easily used anywhere.

As a result, a plurality of 2D images of one side view of the object a are captured under lighting at different angles by the image-capturing element 120 thereby generating the first three-dimensional image 201 of the object a. A plurality of 2D images of another side view of the object a are captured under lighting at different angles by the image-capturing element 120 thereby generating the second three-dimensional image 202 of the object a. The image-processing unit 130 reconstructs three-dimensional images of different views of the object a according to the gray level values of the pixels of the 2D images. The object a is rotated by the rotatable stage 140 thereby allowing 2D images of different views of the object a to be captured by the image-capturing element 120.

Figures 7A, 7B, 7C:
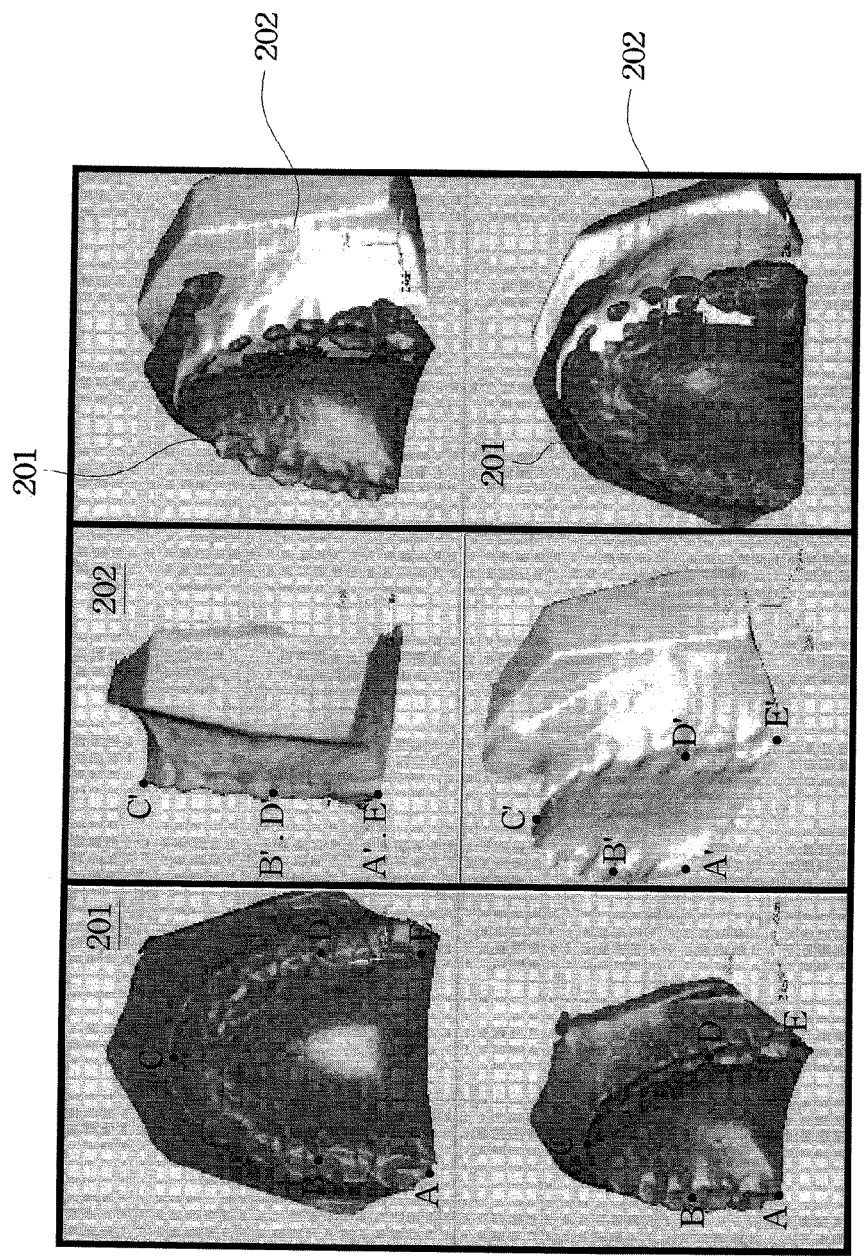
FIG. 7A shows a first three-dimensional image according to one embodiment of the present invention.
FIG. 7B shows a second three-dimensional image according to one embodiment of the present invention.
FIG. 7C shows the registered result of the first and second three-dimensional images according to one embodiment of the present invention.

FIG. 7C shows the registered result of the first three-dimensional image 201 (see FIG. 7A) and the second three-dimensional image 202 (see FIG. 7B) according to one embodiment of the present invention. After the first three-dimensional image 201 and the second three-dimensional image 202 are generated, an image registration step (step 102) is performed to register the first three-dimensional image 201 to the second three-dimensional image 202. Specifically, the image registration step is implemented by firstly selecting a plurality of first control points A, B, C, D and E on the first three-dimensional image 201 and a plurality of second control points A', B', C', D' and E' on the second three-dimensional image 202, wherein the first control points A, B, C, D and E are corresponding to the second control points A', B', C', D' and E', respectively. Namely, the first control points A, B, C, D and E and the second control points A', B', C', D' and E' are corresponding to the same positions on the object a, respectively. Preferably, the first control points A, B, C, D and E and the second control points A', B', C', D' and E' are selected from distinct feature points of the 3D images, e.g., the highest point, the lowest point or the turning point.

Figure 8:
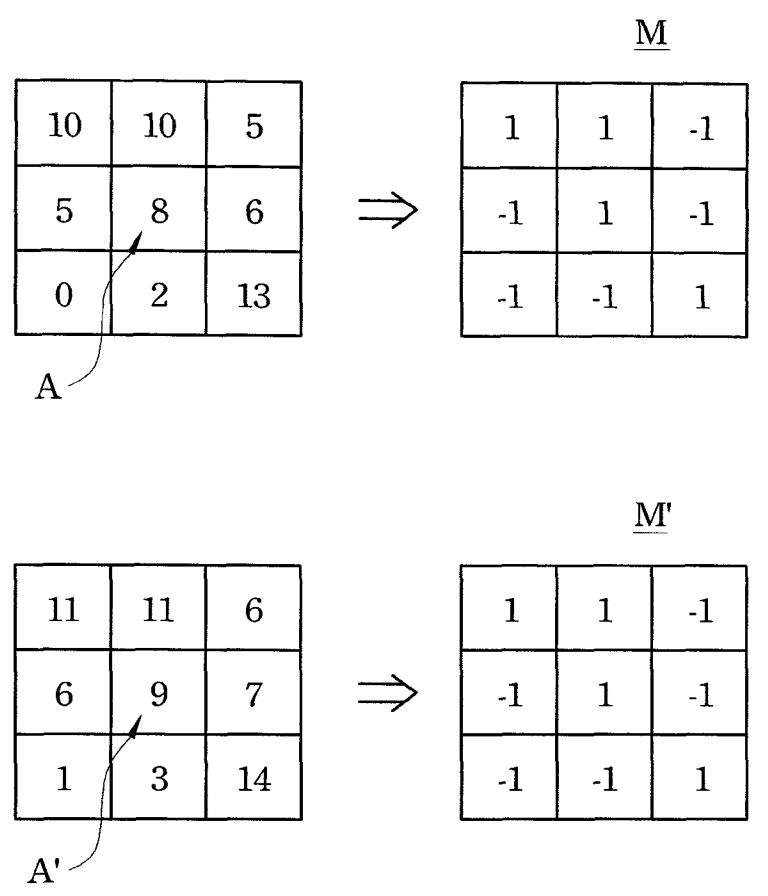

FIG. 8 shows the gray level value matrix corresponding to the pixels around the first control point A and the second control point A' according to one embodiment of the present invention. The height variation tendency of the pixels surrounding each control point is utilized for making sure that the first control points A, B, C, D or E are exactly corresponding to the second control points A', B', C', D' and E'. For example, the right upper matrix M shown in FIG. 8 is constructed by comparing the gray level values (the left upper matrix shown in FIG. 8), i.e., the heights, of the eight pixels surrounding the first control point A with that of the first control point A. Specifically, the matrix elements corresponding to the pixels having a higher gray level value take the value 1, and the matrix elements corresponding to the pixels having a lower gray level value take the value −1. The right lower matrix M' shown in FIG. 8 is constructed in a similar way. Thereafter, the matrix M is compared with the matrix M'. In this case, the first control point A is exactly corresponding to the second control point A', since the matrix M matches the matrix M'. But if the above two matrixes do not match, an algorithm is used to find the exactly corresponding control point with a matched matrix from the surrounding pixels.

Thereafter, the image registration step may be accomplished by a Thin-Plate Spline (TPS) algorithm using the exactly corresponding control points selected on different 3D images to calculate the parameters of the following transformation function. We assume that the to-be-registered surfaces of the first three-dimensional image 201 and the second three-dimensional image 202 consist of a plurality of curved surfaces. Next, an affine transformation step and an elastic deformation step are performed for registering the first three-dimensional image 201 to the second three-dimensional image 202. The affine transformation may include rotation, translation and/or shear. The elastic deformation is performed to fine tune the affine-transformed images thereby precisely registering the first three-dimensional image 201 to the second three-dimensional image 202. The affine transformation step and the elastic deformation step may be performed by a processing element such as a computer. In this embodiment, the affine transformation step and the elastic deformation step are performed by the image-processing unit 130 of the three-dimensional model constructing device 100. The image-processing unit 130 is configured to calculate the parameters of the affine transformation and the elastic deformation according to the first control points A, B, C and D and the second control points A', B', C' and D'.

Figure 9:
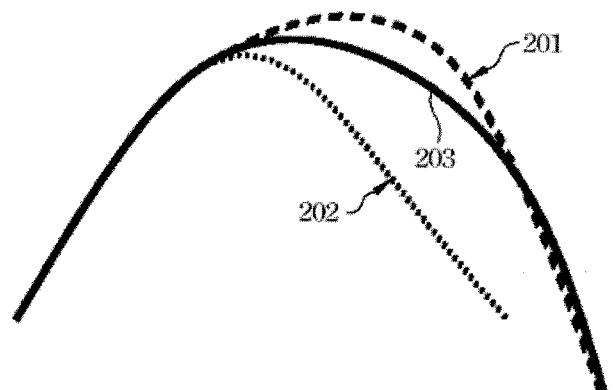
FIG. 9 illustrates a step of integrating the first and second three-dimensional images according to one embodiment of the present invention.
Figure 10:
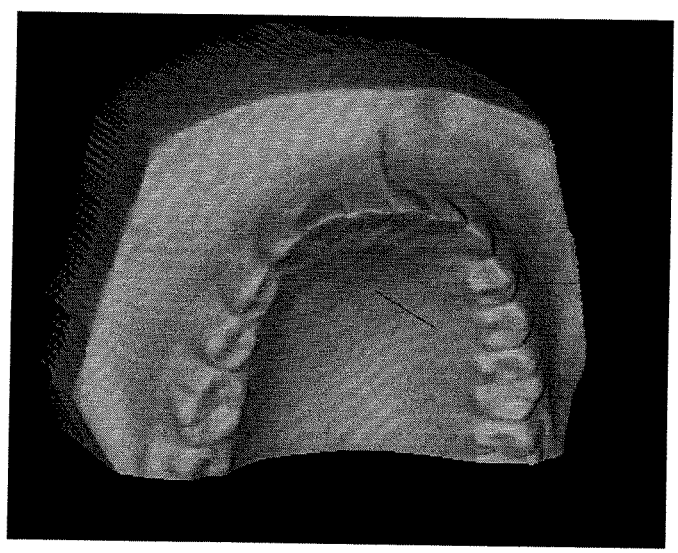
FIG. 10 is a schematic view of a highly accurate three-dimensional model produced according to one embodiment of the present invention.

FIG. 9 illustrates a step of integrating the first and second three-dimensional images according to one embodiment of the present invention. FIG. 10 shows a highly accurate three-dimensional model 203 produced according to one embodiment of the present invention. After the image registration step is completed, an image integration step (step 103) is performed to integrate the first three-dimensional image 201 and the second three-dimensional image 202 into an accurate three-dimensional model. Since the first three-dimensional image 201 and the second three-dimensional image 202 are respectively generated according to different views of the object a, the brightness distribution of the first three-dimensional image 201 may be different from that of the second three-dimensional image 202, i.e., the gray level values of pixels of the first three-dimensional image 201 may be different from the gray level values of the corresponding pixels of the second three-dimensional image 202, respectively. For this reason, the registered result of the first three-dimensional image 201 and the second three-dimensional image 202 is still not a complete three-dimensional model, since the gray level values of the pixels on the overlapped area between the first three-dimensional image 201 and the second three-dimensional image 202 may be different. Then, the image integration step is used to generate an integrated three-dimensional model 203 by calculating the average gray level value of the corresponding pixels of the registered three-dimensional images. Hence, the differences between the gray level values of the corresponding pixels of the first three-dimensional image 201 and the second three-dimensional image 202 are eliminated and the first three-dimensional image 201 and the second three-dimensional image 202 are integrated into an accurate integrated three-dimensional model 203. According to the present invention, the image integration step may be performed by a weighting average operation. Since darker pixels are easily affected by noise than brighter pixels thereby resulting in greater reconstruction error, the brighter pixels are given more weight in the averaging to increase the reconstruction accuracy. For example, as shown in FIG. 9, the first three-dimensional image 201 in this area is brighter than the second three-dimensional image 202. Hence, the first three-dimensional image 201 is given more weight in the averaging such that the integrated result, i.e., the three-dimensional model 203, in this area (see FIG. 9) is more similar to the first three-dimensional image 201 than the second three-dimensional image 202. Because the first three-dimensional image 201 and the second three-dimensional image 202 shows different structure details regarding different views of the object a, the integrated three-dimensional model 203 has a higher accuracy regarding different views of the object a.

Note that the three-dimensional model constructing method of the present invention is not limited to the integration of the three-dimensional images generated from two different views (i.e., the first three-dimensional image 201 and the second three-dimensional image), the integration of the three-dimensional images generated from three or more different views into an accurate three-dimensional model is still considered within the spirit and scope of the invention.

Therefore, the method for constructing a three-dimensional model of the present invention integrates the three-dimensional images generated from a plurality of views into an accurate three-dimensional model.

According to the present invention, there is provided a method for constructing a three-dimensional model which may be implemented by a low cost apparatus. The apparatus of the present invention is portable when a housing is used as the light shielding device. Furthermore, compared with the conventional apparatuses (i.e., CT, MRI or 3D laser scanners), the three-dimensional model constructing apparatus of the present invention is useful without safety problems, relatively easily manipulated, and capable of quick image reconstruction.

Figure 11:
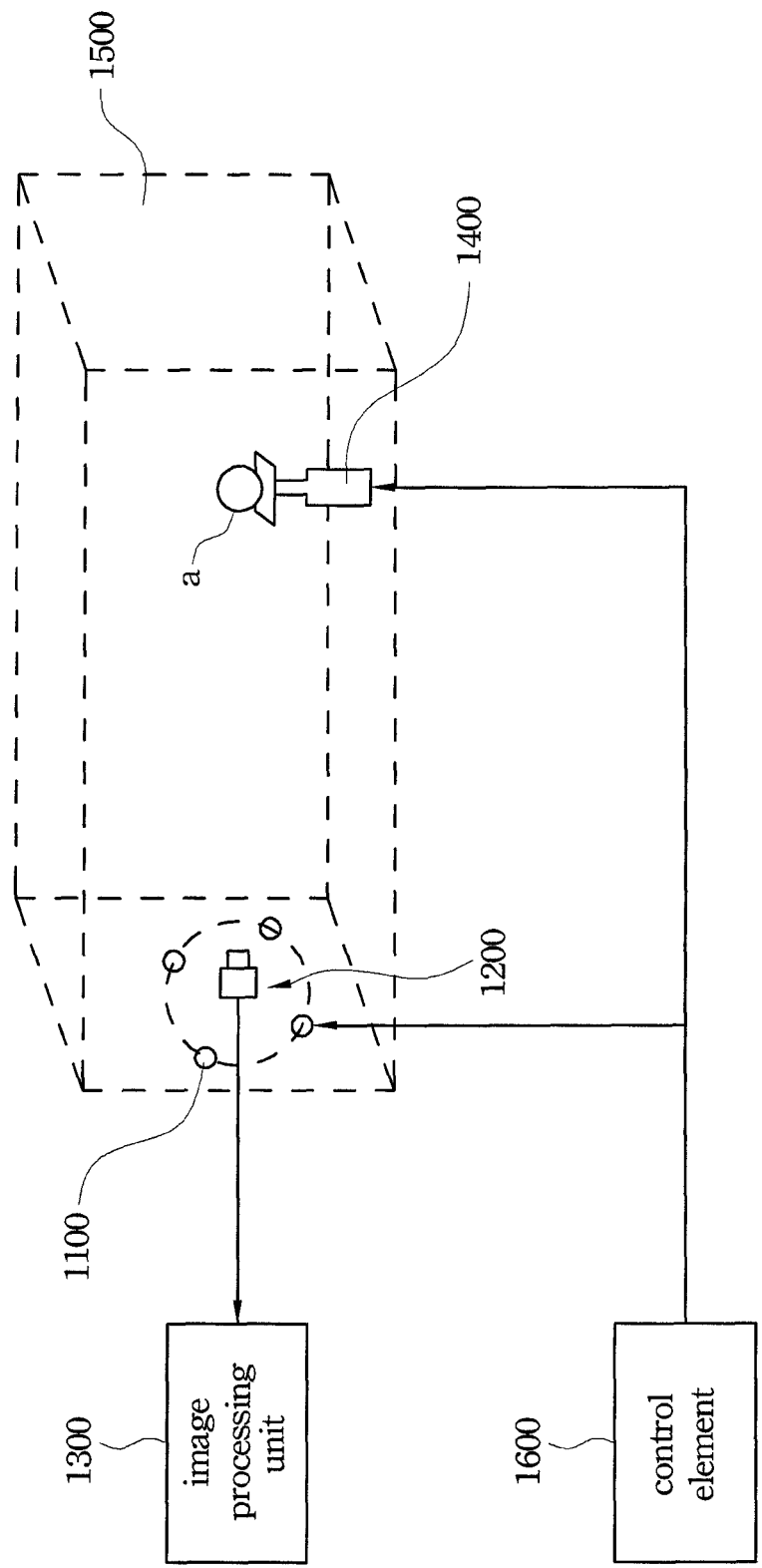
FIG. 11 is a three dimensional view of an apparatus for constructing a three-dimensional model according to another embodiment of the present invention.
Figure 12:
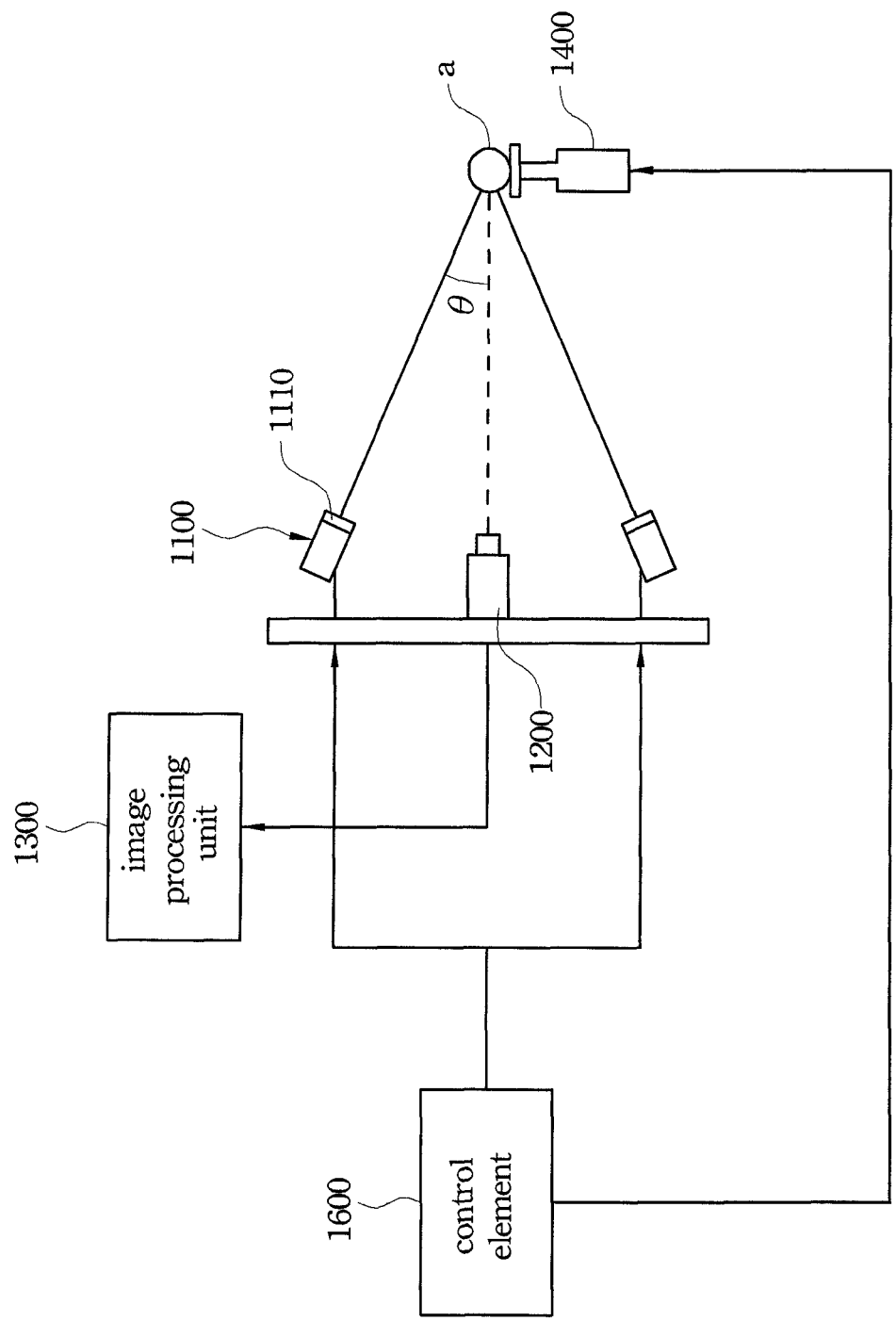
FIG. 12 is a side view of the apparatus for constructing a three-dimensional model according to another embodiment of the present invention.

FIG. 11 shows a three dimensional view of the apparatus for constructing a three-dimensional model according to another embodiment of the present invention. FIG. 12 shows a side view of the apparatus for constructing a three-dimensional model according to another embodiment of the present invention. The apparatus for constructing a three-dimensional model of this embodiment comprises four light sources 1100, an image-capturing element 1200, an image-processing unit 1300, a rotatable stage 1400, a light shielding device 1500 and a control element 1600. These light sources 1100 are disposed at different locations but at the same distance from the object a. The control element 1600 controls the four light sources to illuminate object a one at a time, respectively. Therefore, the image-capturing element 1200 can capture four images (corresponding to four light sources 1100, respectively) of the first side of the object a under illuminating by the four light sources 1100, respectively. The image-processing unit 1300 is electrically connected to the image-capturing element 1200 for processing the two dimensional images into a three-dimensional image of the first side of the object a. In this embodiment, the three-dimensional image of the first side of the object a is reconstructed from the four images captured under illuminating by four light sources 1100 at different locations. In this way, the high accuracy of the three-dimensional model still can be achieved even though the surface structure of the object a is rough and uneven. It is noted that the reconstruction of the three-dimensional model may be generated by only two images captured under illuminating by two light sources at different locations.

The rotatable stage 1400 is configured for supporting the object a and rotating the object a under the control of the control element 1600. The object a is rotated by the rotatable stage 1400 to face the image-capturing element 1200 with the second side of the object a such that the two-dimensional images of the second side of the object a can be captured for three-dimensional image reconstruction of the second side of the object a.

It is noted that at least an overlapped area between two different three-dimensional images of the object a is required for generating an accurate three-dimensional model of the object a. Therefore, the image-capturing element 1200 captures different images from three different sides of the object a. In this case, the control element 1600 controls the rotatable stage 1400 to rotate by an angle of at most 120° each time. In this embodiment, the images of four sides of the object a are captured by the image-capturing element 1200, wherein the control element 1600 controls the rotatable stage 1400 to rotate 90° each time. The light-shielding device 1500 prevents the light sources 1100 and the image-capturing element 1200 from interfering of environmental light.

As shown in FIG. 11 and FIG. 12, the light sources 1100 are disposed at different locations but the same predetermined distance from the same side of the object a for illuminating the object a one at a time, respectively. The predetermined distance may be 1 m such that the object a may be illuminated by enough light thereby reducing the error of three-dimensional image reconstruction. The light sources 1100 are uniformly arranged at a predetermined circular path centered at the image-capturing element 1200. For example, in case there are four light sources 1100 are provided, they are arranged at substantially 90 degrees relative to each other. A diffuser 1110, e.g., a soft focus filter, may be disposed in front of each light source 1100 for providing uniform light. The light sources 1100, of the embodiment may be directional sources such as mini display lamps. Each light source illuminates the center of object a at the same incident angle θ, i.e., the angle between the direction of the incident light and the line connecting the image-capturing element 1200 and the center of object a. The light sources 1100 are electrically connected to the control element 1600, e.g., a programming logical controller (PLC) or a single chip, for controlling the light sources 1100 to illuminate the object a one at a time, respectively. The image-capturing element 1200 is substantially arranged at the center of the circular path at which the light sources 1100 are arranged. When each light source 1100 illuminates the object a, the image-capturing element 1200 subsequently captures the image of the object a. Therefore, a plurality of images of object a are sequentially captured by the image-capturing element 1200 when the light sources 1100 are turned on one at a time. The image-capturing element 1200, e.g., a digital camera or a charge-coupled device (CCD), is electrically connected to the image-processing unit 1300 by an universal serial bus (USB) interface for transmitting the images of the object a to the image-processing unit 1300. Hence, the image-processing unit 1300 may be disposed within a computer and electrically connected to the image-capturing element 1200 by the universal serial bus (USB) interface.

As shown in FIG. 11 and FIG. 12, the rotatable stage 1400 may include a step motor controlled by the control element 1600. The rotation angle of the rotatable stage 1400 may be preferably kept under 120° such that the images from different sides of object a have an overlapped area.

Therefore, the apparatus of the present invention can capture a plurality of 2D images of one view of the object a under lighting at different angles by the image-capturing element 1200. Thereafter, the image-processing unit 1300 reconstructs the three-dimensional images of the object a according to the gray level values of the pixels of the 2D images.

Furthermore, the object a is rotated by the rotatable stage 1400 thereby allowing 2D images of another view of the object a to be captured by the image-capturing element 1200.

In addition, before the images are captured by the image-captured element 1200, an image calibration step may be performed via a white nonreflector such as a white plate to calibration the relative brightness values of the individual light sources.

Figure 13:
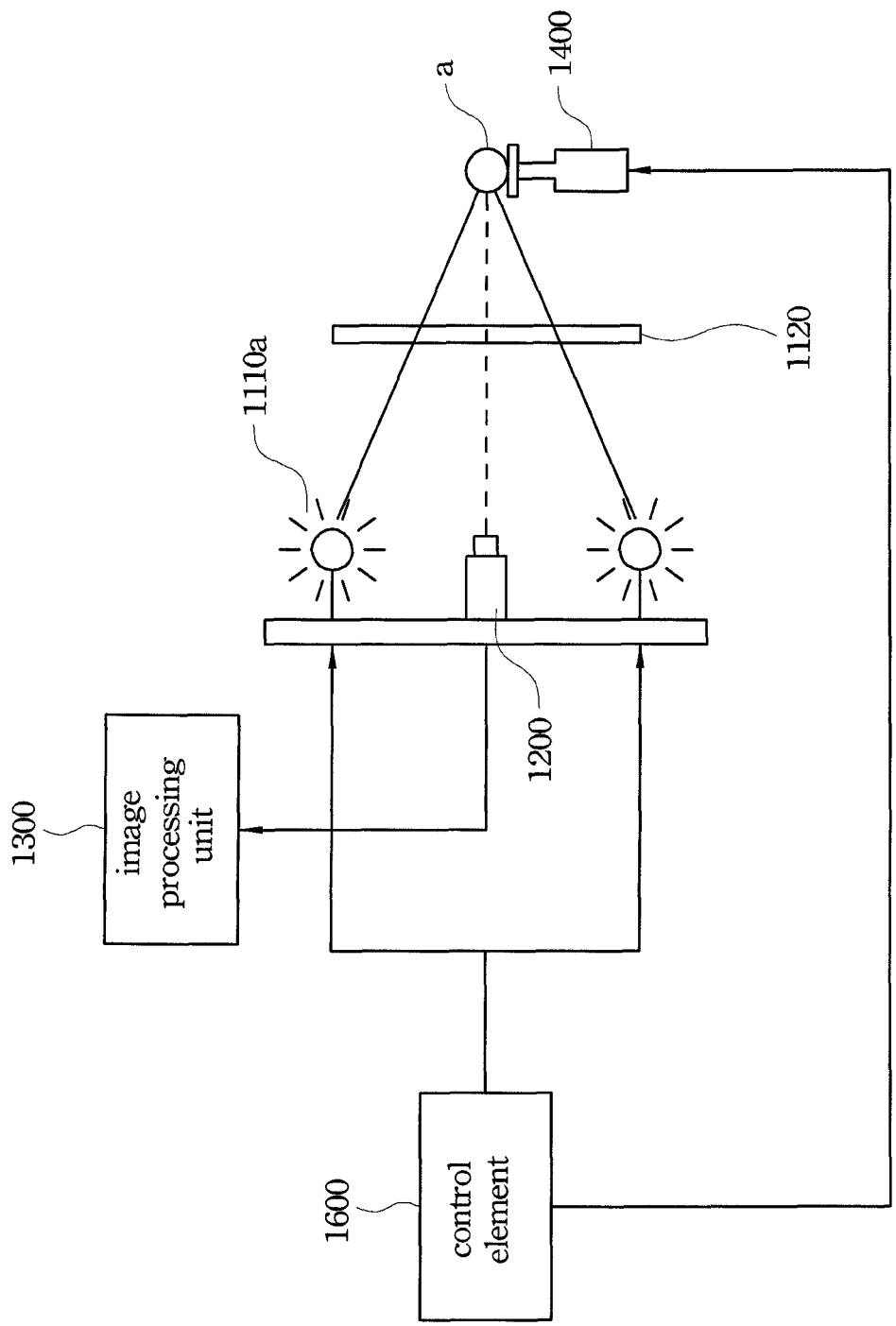
FIG. 13 is a side view of another apparatus for constructing a three-dimensional model according to another embodiment of the present invention.

Please referring to FIG. 13, it shows a side view of the apparatus according to second example of the present invention. Compared with the first embodiment, the apparatus of this embodiment is provided with point light sources 1100a such as light bulbs without diffusers instead of the light sources 1100. Further, a diffuser 1120 is disposed between the light sources 1100a and the object a for diffusing direct light from the light sources 1100a to thereby provide more even illumination on the object a. Hence, the apparatus of this embodiment is simplified.

Figure 14:
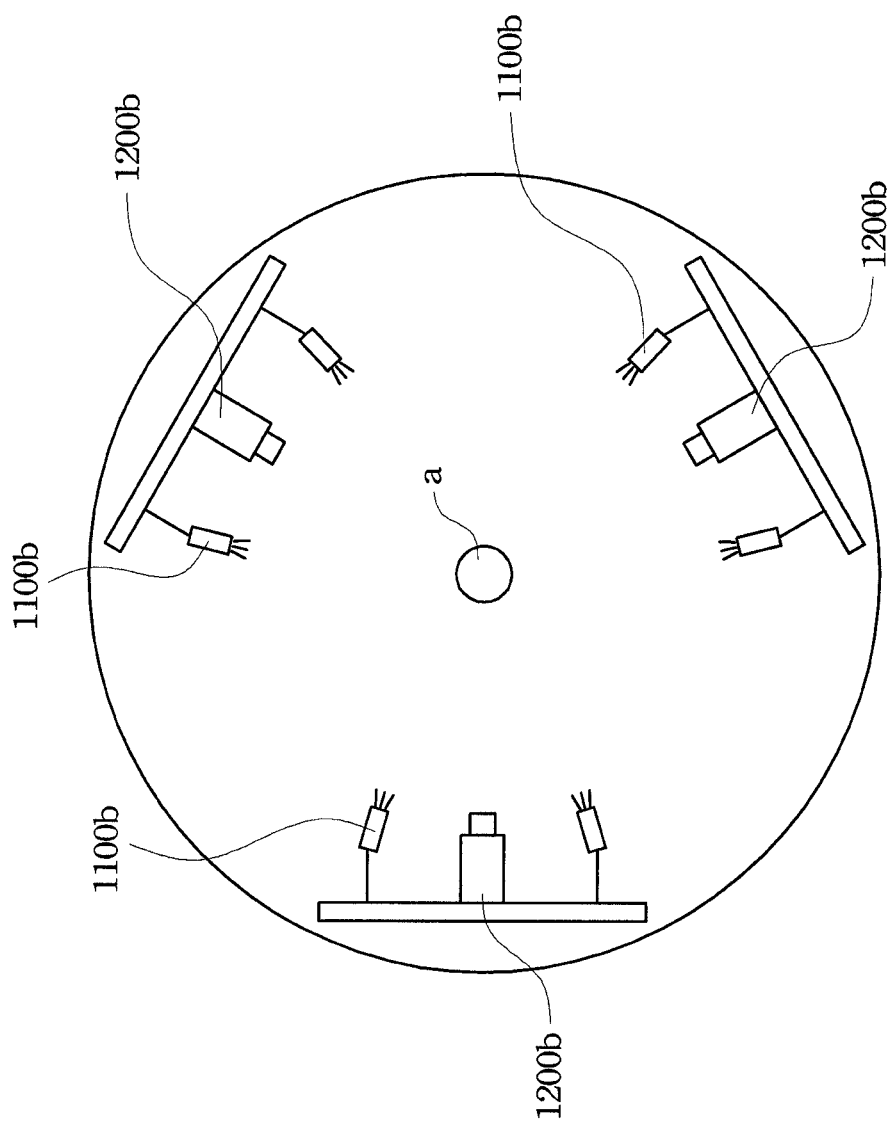
FIG. 14 is a top view of the apparatus for constructing a three-dimensional model according to another of the present invention.

FIG. 14 shows a top view of another apparatus for constructing a three-dimensional model according to another embodiment of the present invention. Compared to the embodiment shown as in FIG. 11, the apparatus for constructing three-dimensional model of this embodiment is implemented without the rotatable stage 1400 but by arranging the light sources 1100b and the image-capturing element 1200b at different locations but at the same distance from different sides of the object a.

Figure 15:
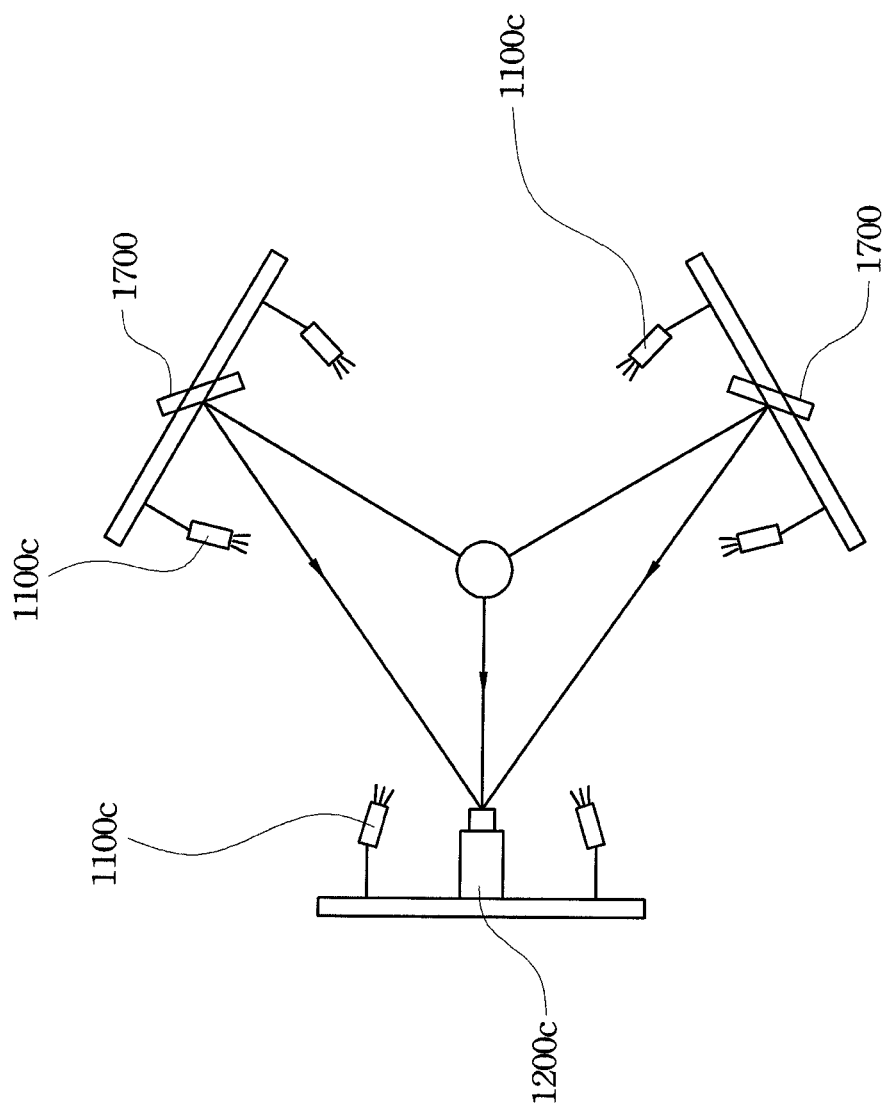
FIG. 15 is a top view of the apparatus for constructing a three-dimensional model according to another of the present invention.

FIG. 15 shows a top view of another apparatus for constructing a three-dimensional model according to another of the present invention. Compared to the embodiment shown as in FIG. 15, the apparatus for constructing a three-dimensional model of this embodiment is implemented by arranging the light sources 110c at different locations but at the same distance from different sides of the object a, and providing two optic mirrors 1700 for reflecting the images of the object a to the image-capturing element 1200c such that thereby allowing the images from different sides of the object a to be captured by the image-capturing element 1200c.

While the present invention is described in detail referring to the attached embodiments, various modifications, alternate constructions and equivalents may be employed without departing from the true spirit and scope of the present invention.

What is claimed is:

1. An apparatus for constructing a three-dimensional image of an object, said apparatus comprising:
   a plurality of light sources disposed at different locations but at the same distance from said object; at least one image capturing element for respectively capturing a plurality of two-dimensional images of said object under illuminating by said light sources which are turned on one at a time; an image processing element electrically connected to said image capturing element for generating said three-dimensional image by shape-from-shading algorithm based on said two-dimensional images; and a rotatable stage for supporting said object, wherein the rotatable stage comprises a substrate, a rotatable body, a protrusion structure, a holder, a lever, and a rotatable plate; wherein the substrate provides a rotating force to the rotatable body when the apparatus is operated; wherein the protrusion structure is disposed between the substrate and the rotatable body; wherein the holder is on the rotatable body; wherein the rotatable plate is pivotally connected to the holder and the rotatable plate fixes and rotates said object; wherein the lever is disposed through the rotatable body and connected to the rotatable body; wherein the lever is pivotally connected to the rotatable plate; wherein the lever abuts against the protrusion structure; wherein when the lever is moved to the substrate, the lever is moved to a lower position; wherein when the lever is moved to the protrusion structure, the lever is moved to an upper position.

2. The apparatus of claim 1, wherein said plurality of light sources are arranged at different angles of said object.

3. The apparatus of claim 1 further comprising a shielding device for shielding said plurality of light sources and said image capturing element for eliminating external light effort.

4. The apparatus of claim 1, wherein said light sources are uniformly arranged at a predetermined circular path centered at said image capturing element.

5. The apparatus of claim 1, wherein said light sources are turned on one at a time by a programming logical controller (PLC).

6. The apparatus of claim 1, wherein each of said light sources is a point light source.

7. The apparatus of claim 1, wherein each of said light sources is a collimated light source and illuminates the center of said object at the same incident angle.

* * * * *